US008303075B2

(12) United States Patent
Ito

(10) Patent No.: US 8,303,075 B2
(45) Date of Patent: Nov. 6, 2012

(54) APPARATUS AND METHOD OF CONTROLLING SAME

(75) Inventor: Hiroki Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 12/875,282

(22) Filed: Sep. 3, 2010

(65) Prior Publication Data

US 2011/0063343 A1    Mar. 17, 2011

(30) Foreign Application Priority Data

Sep. 14, 2009  (JP) ................... 2009-211844
Jul. 27, 2010   (JP) ................... 2010-168485

(51) Int. Cl.
*B41J 29/38* (2006.01)

(52) U.S. Cl. ........................................ 347/19

(58) Field of Classification Search ................. 347/5, 16, 347/101, 104, 19
See application file for complete search history.

(56) References Cited

U.S. PATENT DOCUMENTS 7,898,684 B2 * 3/2011 Higashiura .................. 358/1.17

FOREIGN PATENT DOCUMENTS

JP         2009-272796       11/2009

* cited by examiner

*Primary Examiner* — An Do
(74) *Attorney, Agent, or Firm* — Fitzpatrick, Cella, Harper & Scinto

(57) ABSTRACT

An apparatus according to the present invention comprises control unit configured to control print unit to print a code in a prescribed area on a sheet, and search unit configured to search the code on the sheet placed on a manuscript table, wherein a search area in which the search unit searches the code is wider than the prescribed area.

19 Claims, 11 Drawing Sheets

BAR CODE IS DETECTED OUT OF PRESCRIBED RANGE
OF THIS SENTENCE.
MANUSCRIPT IS POSSIBLY NOT SET CORRECTLY.
CONFIRM MANUSCRIPT SET POSITION    1301

| O K | CANCEL |

FIG.12 ably provided. In addition, in the figures used for explanation of
APPARATUS AND METHOD OF CONTROLLING SAME

BACKGROUND OF THE INVENTION

1. Field of the Invention

The present invention relates to an apparatus for accurately detecting a code contained in a manuscript and a method of controlling the apparatus.

2. Description of the Related Art

In a case of printing electronic data for producing a piece of printed matter, a security management to the printed matter is difficult, causing degradation in a security level of the printed matter.

Therefore, the technology of specifying a route of information leakage in the printed matter has been proposed for retaining the security to the printed matter. One example of such a technology includes a technology where a bar code is added to a medium such as a sheet on which a piece of printed matter is copied to embed trace information relating to a route of information leakage of the printed matter (for example, ID of a user who has copied the printed matter and the date for the copying) in the printed matter. Owing to this technology, when the trace information is embedded in the printed matter at the time of copying the printed matter, the information of the user who has copied is left on the printed matter. In consequence, a malicious act of the user can be prevented, for example.

The technology, in which the trace information is encoded to generate a bar code and the bar code is added to the printed matter, is disclosed as a technology of using the trace information. Here, "bar code" includes not only the conventional bar code, that is, a bar code for expressing information by a width of a bar, but also a two-dimensional bar code or a watermark.

According to the above technology, in a case of copying the printed matter to newly generate a copied object, the bar code embedded in the printed matter is detected, is further decoded to obtain the trace information and new trace information is added to the obtained trace information. After all, the trace information is updated. In addition, the trace information (the updated trace information) to which the new trace information is added is encoded to newly generate a bar code, and the newly generated bar code is added to an image for copying to generate a copied object.

However, for detecting this bar code, it is necessary to add the processing which is conventionally not required. In consequence, there occurs a problem that the processing hours in copying increase as a whole.

For alleviating the problem relating to the above processing hours, Japanese Patent Laid-Open No. 2009-272796 has proposed the following technology.

In the technology described in Japanese Patent Laid-Open No. 2009-272796, the bar code is printed in a predetermined region at the time of producing the printed matter. In a case of detecting the bar code from the predetermined region, the above trace information is updated. By thus printing the bar code to the predetermined region and detecting it in the predetermined region only, the time for detection is suppressed.

However, there are some cases where a user does not appropriately put a manuscript on a copying machine. For example, there are cases where a user orthogonally puts the manuscript on the copying machine. In this case, in the technology described in Japanese Patent Laid-Open No. 2009-272796, there possibly occurs a failure in detection of the bar code.

SUMMARY OF THE INVENTION

For solving the above problem, an apparatus according to the present invention comprises control unit for controlling print unit to print a code within a prescribed area on a sheet, and search unit for searching the code on the sheet placed on a manuscript plate, wherein a search area in which the search unit searches the code is wider than the prescribed area.

According to the present invention provided with the above arrangement, even if a user puts the manuscript out of a reading section on the copying machine, the code contained in the manuscript is accurately detected.

Further features of the present invention will become apparent from the following description of exemplary embodiments (with reference to the attached drawings).

BRIEF DESCRIPTION OF THE DRAWINGS

FIG. 12 is a diagram showing a dialog box 1301.

DESCRIPTION OF THE EMBODIMENTS

Hereinafter, embodiments according to the present invention will be exemplified with reference to the accompanying drawings. However, relative arrangements, formulas and numerals of components described in the embodiments should not be interpreted in such a manner as to limit the scope of the present invention only thereto unless particularly specific descriptions are made.

First Embodiment

Figure 1:
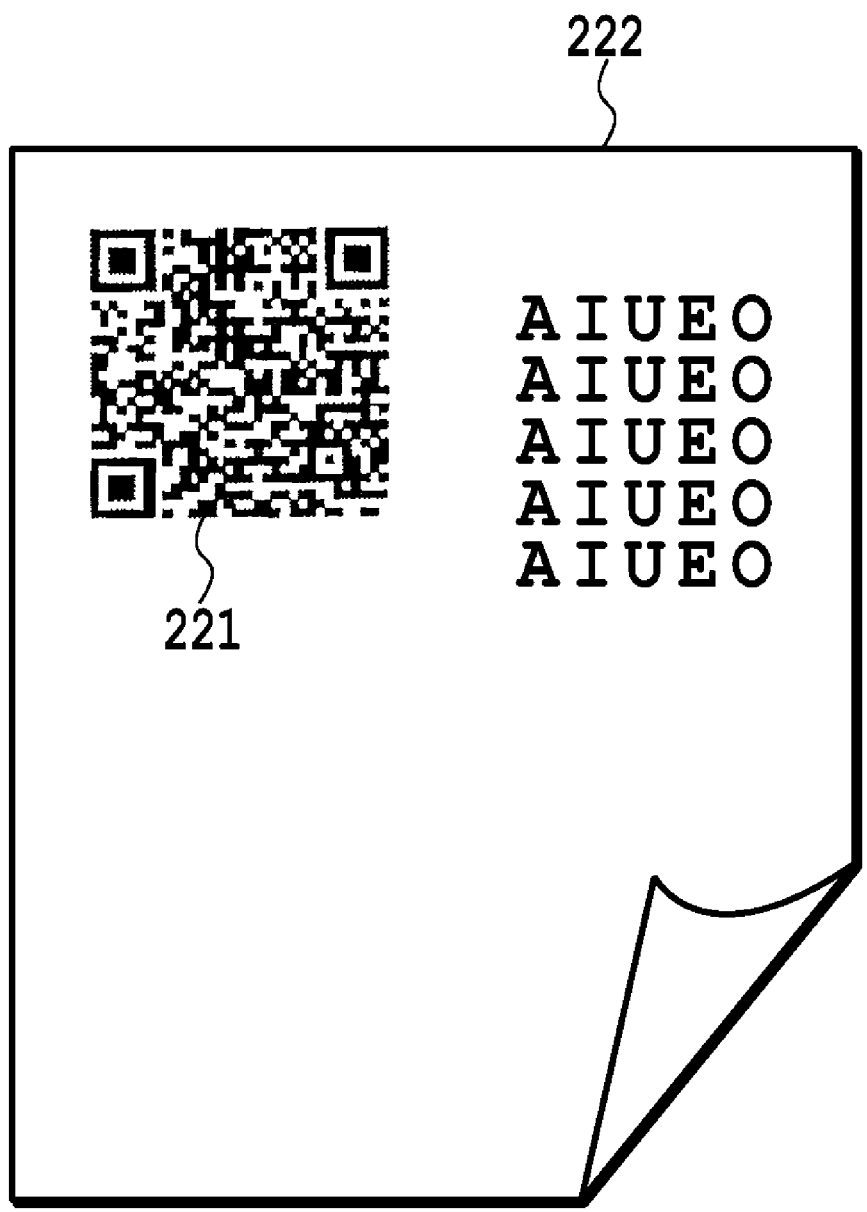
FIG. 1 is a diagram showing an outside appearance of a piece of printed matter.

FIG. 1 is a diagram showing an outside appearance of a piece of printed matter containing a bar code. In FIG. 1, a bar code 221 is printed on a top left side of a piece of printed matter 222. Here, a position where the bar code 221 is printed, or a size and number of the bar code 221 are arbitrarily provided. In addition, in the figures used for explanation of the present invention, an example of the bar code is shown as a QR code (registered trademark), but the bar code may be any code other than the QR code (registered trademark).

Figure 2:
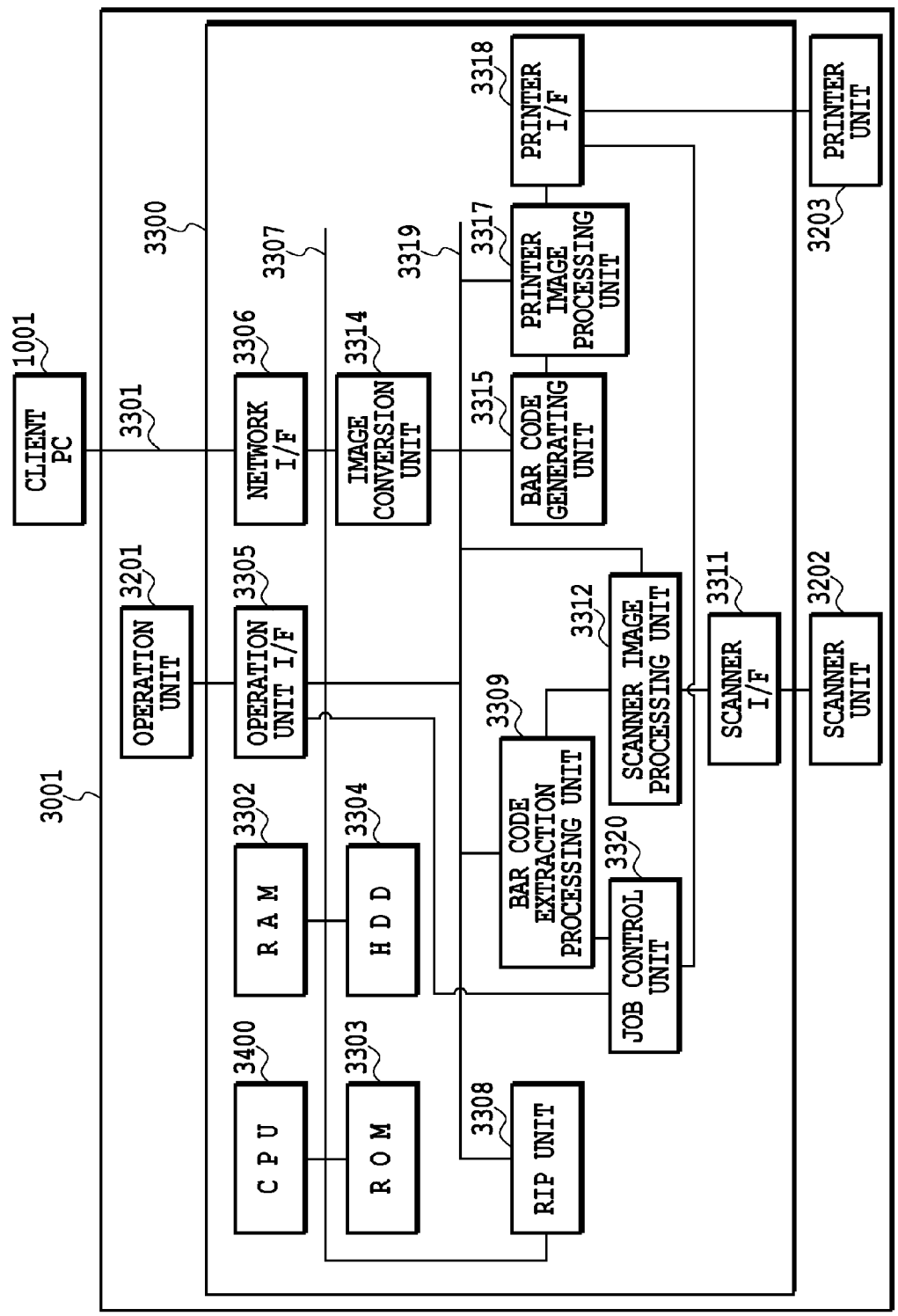
FIG. 2 is a block diagram showing an inside of an image processing apparatus 3001.

FIG. 2 is a block diagram showing an inside of an image processing apparatus 3001.

A controller 3300 controls a scanner unit 3202 and a printer unit 3203. In addition, the controller 3000 controls data communications between a client PC 1001 and an image processing apparatus 3001 through a LAN or WAN 3301.

A RAM 3302 is a work memory for operating a CPU 3400, and is also a memory for temporarily storing manuscript image data which the image processing apparatus 3001 has received.

A ROM 3303 stores a boot program of the image processing apparatus 3001 therein.

A HDD 3304 is a hard disc drive, and stores system software of the image processing apparatus 3001 and the manuscript image data which the image processing apparatus 3001 has received.

An operation unit I/F 3305 is an interface for connecting a system bus 3307 and an operation unit 3201. The operation unit I/F 3305 receives manuscript image data to be displayed in the operation unit 3201 from the system bus 3307, outputs the received manuscript image data to the operation unit 3201, and also outputs information inputted from the operation unit 3201 to the system bus 3307.

A network I/F 3306 is an interface board for connecting the LAN or WAN 3301 and the system bus 3307.

An image bus 3319 is a transmission path for exchanging the manuscript image data and is configured with a PCI bus or an IEEE 1394.

A scanner image processing unit 3312 transfers the manuscript image data received through a scanner I/F 3311 from the scanner unit 3202 to a bar code extraction processing unit 3309.

The bar code extraction processing unit 3309 detects the bar code added to the manuscript image data for decoding. Inconsequence, the additional information is obtained from the manuscript image data. In addition, the detection and decoding are performed based upon a control program stored in the ROM 3303 or the HDD 3304 by the CPU 3400 in the controller 3300.

Here, the detection and decoding of the bar code may be performed by software (soft decoder) on the CPU 3400 since calculation costs are generally low, but may be performed by hardware other than the above.

A printer image processing unit 3317 performs the image processing (image processing required for printing, for example, in a halftone) to the received manuscript image data.

A bar code generating unit 3315 encodes the additional information to generate a bar code. Then, the printer image processing unit 3317 adds the generated bar code to the manuscript imager data. The additional processing of the bar code by the printer image processing unit 3317 is performed based upon the control program stored in the ROM 3303 or the HDD 3304 by the CPU 3400 in the controller 3300.

An image conversion unit 3314 performs predetermined conversion processing such as rotation, color space conversion, binary-multi valued conversion, image combination, and skipping to the manuscript image data.

A RIP unit 3308 receives intermediate data generated based upon PDL code data transmitted from the client PC 1001 to generate bit map data. The generated bit map data are transmitted to the image bus 3319.

With reference to FIG. 2, an operation of the image processing apparatus 3001 will be in detail explained.

When a user places a manuscript on a manuscript feeder and the operation unit 3201 receives a copy start instruction from the user, the scanner unit 3202 starts with reading the manuscript. The scanner unit 3202 transmits the received manuscript image data through the scanner I/F 3311 to the scanner image processing unit 3312. The scanner image processing unit 3312 transmits the received manuscript image data to the bar code extraction processing unit 3309.

The bar code extraction processing unit 3309 performs detecting and decoding of the bar code to the received manuscript image data. It should be noted that processing composed of a combination of detecting and decoding is the extraction processing.

The bar code extraction processing unit 3309 transmits the extraction result (that is, additional information obtained by the extraction) to a job control unit 3320.

The job control unit 3320 determines whether to perform or stop a copy operation based upon the received extraction result.

In a case where the job control unit 3320 determines that the copy operation is stopped, the job control unit 3320 transmits a stop command of the copy operation through a printer I/F 3318 to the printer unit 3203. Further, the job control unit 3320 controls the operation unit I/F 3305 to display the dialog box 41 in FIG. 5 to be described later on the operation unit 3201.

It should be noted that when the printer unit 3203 receives the stop command of the copy operation from the job control unit 3320, the printing is stopped even during printing.

A system comprising the image processing apparatus 3001, the scanner unit 3202 and the printer unit 3203 according to the present embodiment serves to copy the printed matter. It should be noted that the system comprising the image processing apparatus 3001, the scanner unit 3202 and the printer unit 3203 may be simply called a copying machine. Of course, the expression of the copying machine includes a copying machine having a function of copying only and also a copying machine to which the other function (for example, e-mail transmission function) is added.

Figure 3:
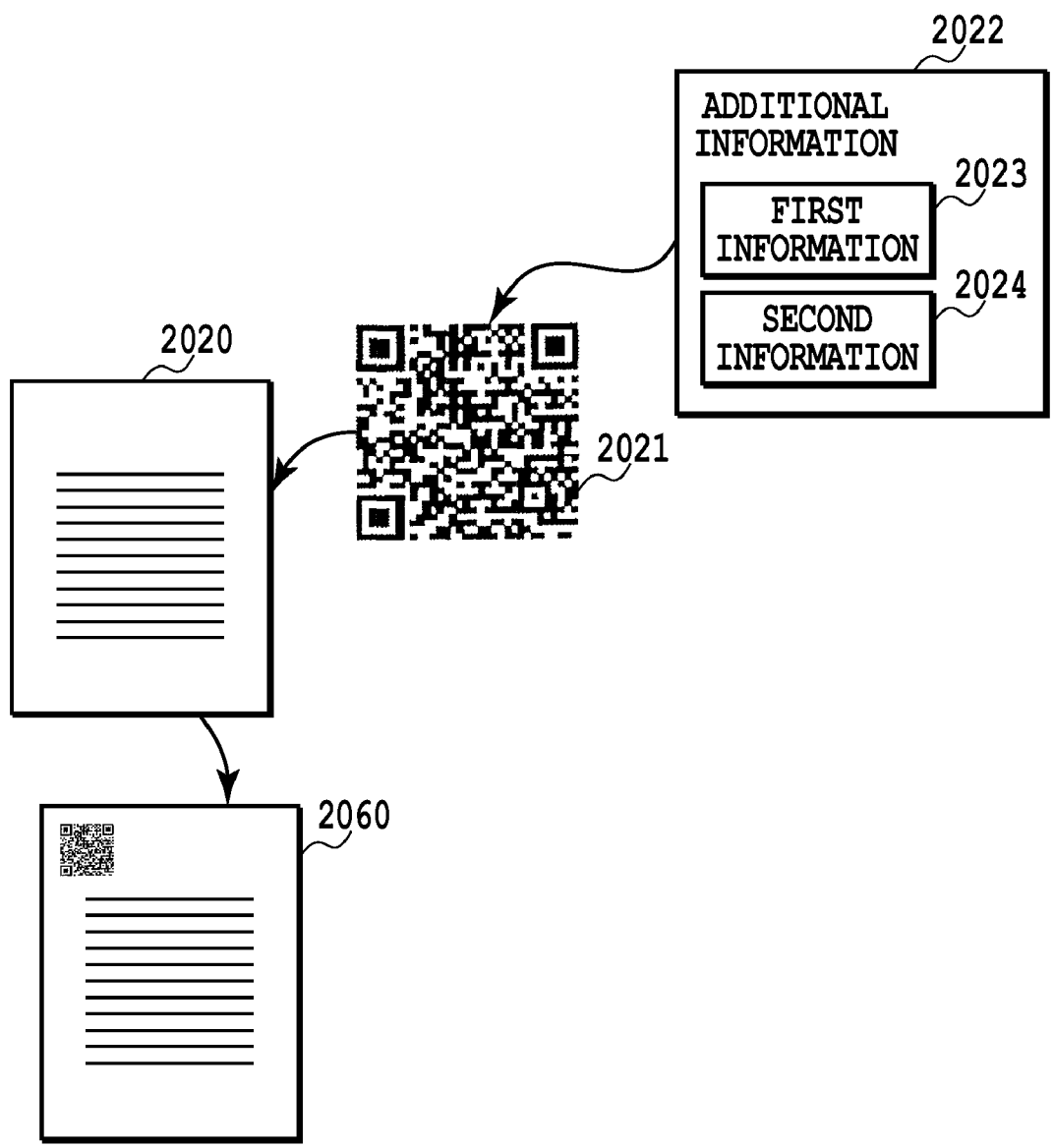
FIG. 3 is a diagram showing additional information 2022 contained in a state of being encoded in a bar code.

FIG. 3 is a diagram showing the additional information 2022 contained in a state of being encoded in the bar code 2021. The additional information 2022 contains first information 2023 and second information 2024.

The first information 2023 is used as copy control information controlling a print of the manuscript image data.

The second information 2024 contains information (trace information) for tracing a copier of a piece of printed matter 2060 in which the bar code 2021 is added to a piece of paper 2020 and tracing a route of information leakage of the printed matter. The trace information contains information at printing, such as a printing date, a user name of a user which instructs a print, and a device name. By thus making the copy control information and the trace information be contained in one bar code, the bar code can be quickly detected without the bar code's causing disfigurement of the printed matter, for example.

When a user tries to copy the printed matter to which the bar code is added, using the copying machine, the copying machine detects that the bar code is added to the printed matter. Then, the copying machine decodes the bar code to obtain additional information. In addition, the copy operation is controlled according to the copy control information among the additional information. For example, in a case where the copy control information shows "copy prohibition" (in a case where the copy control information contains copy prohibition information), the copying machine stops the copy operation. This can prevent a copy of the printed matter which is prohibited to be copied. In reverse, in a case where the copy control information shows "copy permission" (in a case where the copy control information contains the copy permission information), the copying machine continues to perform the copy operation. It should be noted that the information showing the copy prohibition is "1" and the information showing the copy permission is "0", which are stored in a predetermined position (for example, a head) inside the additional information.

Use of the above copy control information can prohibit, for example, a employee with a malicious intent to copy a piece of printed matter in a company office. In addition, by quickly decoding the copy control information from the bar code, the copying machine can quickly determine whether or not a copy of the printed matter as a copy object is prohibited. For example, in a case where it is determined that the copy of the printed matter as the copy object is permitted based upon the copy control information, the printed matter can be quickly copied to meet a copy need of a user in the copying machine.

Figure 4:
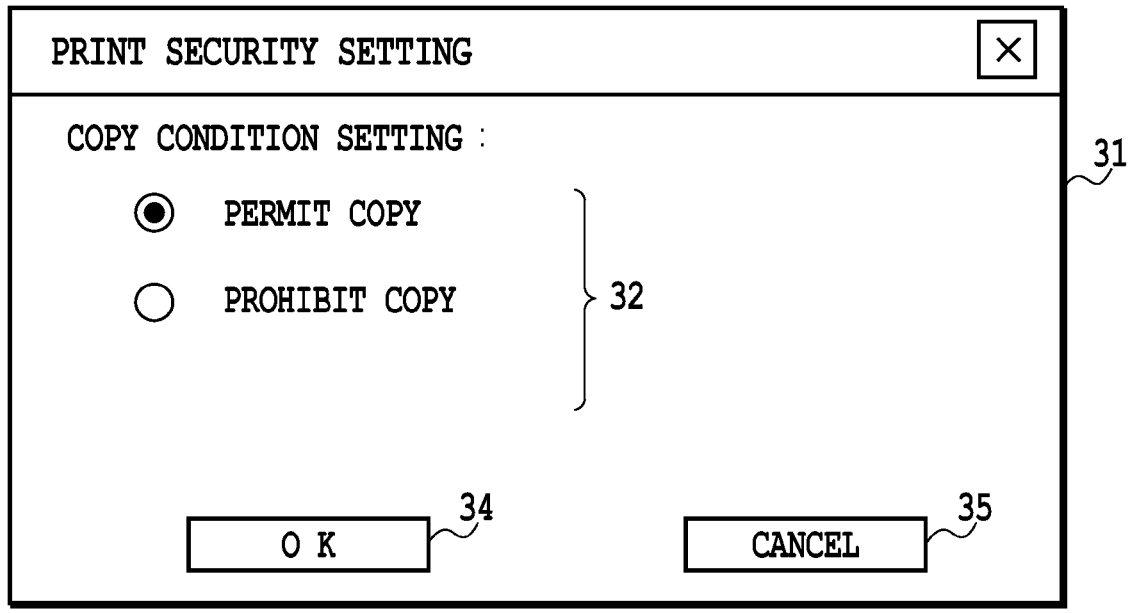
FIG. 4 is a diagram showing an example of a setting screen of copy control information which the image processing apparatus 3001 adds to the printed matter.

FIG. 4 shows an example of a setting screen of copy control information which the image processing apparatus 3001 adds to a piece of printed matter.

A print security setting dialog box 31 as shown in FIG. 4 is displayed by the operation unit 3201 and is a screen on which a user sets the content of the additional information to the printed matter in the copying machine.

When a check mark inputted from a user is received in radio buttons 32 in the print security setting dialog box 31, the image processing apparatus 3001 sets one out of conditions of "copy is permitted" and "copy is prohibited" in regard to the content of the copy control information to be added. The selected copy control information is stored in the HDD 3304. It should be noted that in a case where the image processing apparatus 3001 does not receive selection of the copy control information from the user, the image processing apparatus 3001 sets the condition of "copy is permitted" as a default setting to the copy control information.

The content of the copy control information stored in the HDD 3304 is used at printing including copying and is added to print data as the copy control information within the additional information.

The setting of the copy control information in the print security setting dialog box 31 may be made only to the copying operation by the image processing apparatus 3001 at the time a general user instructs a copy. In addition, the image processing apparatus 3001 may be limited to receive the setting of the copy control information in the print security setting dialog box 31 from a user only such as a manager having a higher operation authority than a general user. The setting of the copy control information may be made to all of print operations including the copy operation of the copying machine. A final setting of the copy control information by the print security setting dialog box 31 is terminated when the image processing apparatus 3001 receives pushing-down of a button 34. When the image processing apparatus 3001 receives pushing-down of a button 35, the setting by the print security setting dialog box 31 is cancelled.

Then, with reference to FIG. 2 and FIG. 4, the print operation of the image processing apparatus 3001 will be in detail explained.

When the client PC 1001 receives a print operation instruction of print data from a user, the client PC 1001 generates PDL code data. In addition, the client PC 1001 transmits the PDL code data through the LAN or WAN 3301 to the image processing apparatus 3001. The transmitted PDL code data are transmitted through the network I/F 3306 and the system bus 3307 to the CPU 3400.

The CPU 3400 generates intermediate data based upon the PDL code data received from the system bus 3307. Thereafter, the CPU 3400 transmits the intermediate data to the RIP unit 3308.

The RIP unit 3308 generates bit map data from the received intermediate data. The generated bit map data are transmitted through the image bus 3319 to the printer image processing unit 3317.

The bar code generating unit 3315 puts together the set contents of the copy control information and the trace information stored in the HDD 3304 (put together two divided pieces of information into one piece of the information). Here, the trace information includes information such as a printing date, a user name (that is, user ID) of a user which instructs a print, and a device name. In consequence, the additional information is generated. The additional information is encoded to generate a bar code. Thereafter, the generated bar code is transmitted through the image bus 3319 to the printer image processing unit 3317.

The printer image processing unit 3317 adds the bar code generated in the bar code generating unit 3315 to the bit map data generated in the RIP unit 3308 to generate print image data. Thereafter, the print image data are transmitted through the printer unit I/F 3318 to the printer unit 3203 for printing.

Figure 5:
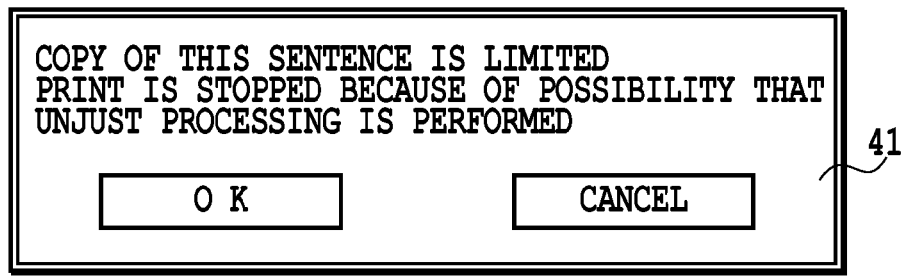
FIG. 5 is a diagram showing a dialog box 41.

FIG. 5 shows a dialog box 41 displayed on the operation unit 3201 when a user makes an attempt of copying the printed document to which a bar code showing "copy is prohibited" as the copy control information is added. When the copying machine detects that the copy control information showing "copy is prohibited" is contained in the printed document as a copy object, the copying machine notifies a user of the massage of not performing the copy. Accordingly, the user who has received this notice should give up copying.

Figure 6:
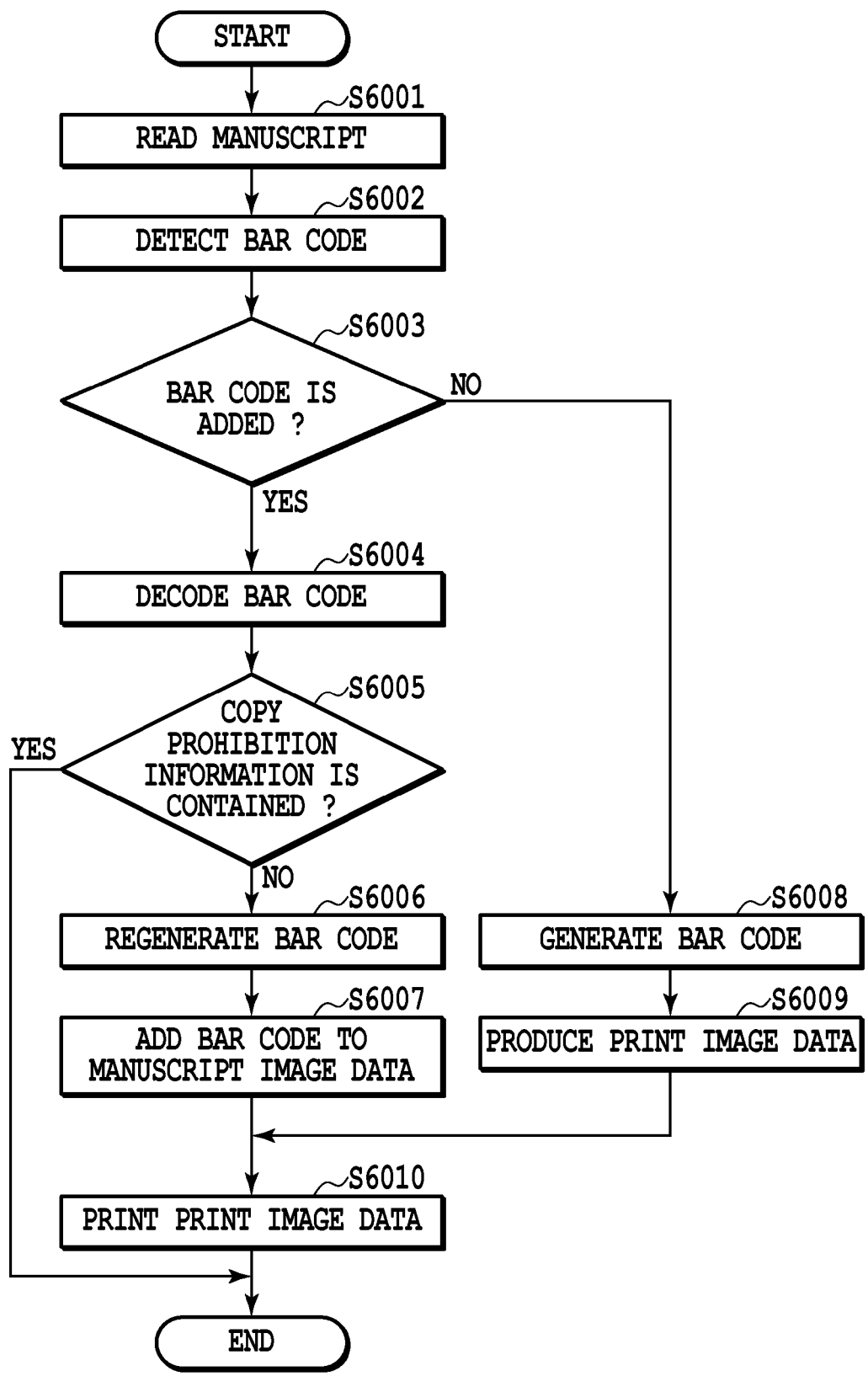
FIG. 6 is a flow chart showing the process order of copy control performed by a copying machine.

FIG. 6 is a flow chart showing the process order of the copy control performed by the copying machine.

At step S6001, the operation unit 3201 receives a copy start instruction from a user. When the instruction is transmitted to the scanner unit 3202, the scanner unit 3202 reads a manuscript and transmits the read manuscript image data via the scanner I/F 3311 and the scanner image processing unit 3312 to the bar code extraction processing unit 3309. It should be noted that at this time, when the scanner image processing unit 3312 receives the manuscript image data, image processing such as a gamma correction is performed. In addition, the scanner image processing unit 3312 transmits the manuscript image data subjected to the image processing to the bar code extraction processing unit 3309 and the printer image processing unit 3317.

Then, at step S6002, the bar code extraction processing unit 3309 performs processing of detecting a bar code from the manuscript image data received from the scanner image processing unit 3312.

At step S6003, in a case where the bar code extraction processing unit 3309 determines that the bar code is added to the manuscript image data in response to an instruction of the job control unit 3320, the process goes to step S6004.

At step S6003, in a case where the bar code extraction processing unit 3309 determines that the bar code is not added to the manuscript image data in response to an instruction of the job control unit 3320, the process goes to step S6008.

At step 6004, the bar code extraction processing unit 3309 performs decoding processing to the bar code detected from the manuscript image data. In consequence, the additional information is obtained from the manuscript image data. After completion of the decoding processing, the process goes to step S6005.

At step S6005, the bar code extraction processing unit 3309 determines whether or not information prohibiting a copy (copy prohibition information) as the copy control information is contained among the additional information. In a case where the information prohibiting the copy is not contained in the copy control information, since the information permitting the copy is contained in the copy control information, the process goes to step S6006. It should be noted that the information prohibiting the copy (copy prohibition information) is information of "1" and the information permitting the copy (copy permission information) is information of "0".

In a case where at step S6005, the bar code extraction processing unit 3309 determines that the information prohibiting the copy (copy prohibition information) as the copy control information is contained among the additional information, the job control unit 3320 determines a stop of the copy operation. The job control unit 3320 cancels the job to stop the copy operation of the printer unit 3203. At this time, the job control unit 3320 displays the dialog box 41 shown in FIG. 5 to the operation unit 3201 to inform a user of stopping the print. Thereafter, the process ends.

At step S6006, the bar code generating unit 3315 generates new additional information from the additional information and the new trace information. In addition, this additional information is encoded. In consequence, the bar code is regenerated.

Specifically the bar code generating unit 3315 maintains the copy control information (that is, information permitting a copy (copy permission information)) among the additional information obtained in the bar code extraction processing unit 3309 as it is. That is, the copy control information is not changed to be maintained as the same information. On the other hand, the trace information is updated in such a manner as to add new trace information to the old trace information. That is, the copy control information is maintained as it is and only the trace information is updated. It should be noted that in the present specification, "update" has the same meaning as "change". Owing to this processing, an initial intent of a user who has permitted a copy and produced the printed matter can be respected.

It should be noted that the trace information includes information such as a printing date, a user name (that is, user ID) of a user which instructs a print, and a device name. In addition, in a case where a user name of a user who makes a print instruction can not be obtained, it is sufficient only for information useful for specifying a copier to be contained. A definition of the trace information in the present specification is information usable for specifying a copier.

In addition, "updating the above trace information" is marking up new trace information to the old trace information. However, in a case where there is a limit to an amount of the trace information which can be marked up, the oldest trace information is deleted among the additional information added to the manuscript image, and the new trace information is added. However, in a case where the oldest trace information is deleted, information of a producer of the manuscript image may be left. In this way, an event that a part of the old trace information is deleted and the new trace information is added is also included in the meaning of the word called update of the trace information.

The bar code generating unit 3315 combines the trace information changed as above with the copy control information not changed to generate new additional information. The bar code generating unit 3315 encodes the corresponding new additional information to generate a new bar code and transmits the generated bar code to the printer image processing unit 3317. Then, the process goes to step S6007.

At step 6007, the printer image processing unit 3317 adds the new bar code generated in the bar code generating unit 3315 at step S6006 to the print image data. At this time, the printer image processing unit 3317 arranges the new generated bar code at the same position as the bar code (inside the manuscript image data) detected in the bar code extraction processing unit 3309. That is, the printer image processing unit 3317, in response to a combination instruction of the bar code to a specific location of the manuscript image data from the scanner image processing unit 3312, adds (combines) a new bar code to the manuscript image data transmitted from the scanner image processing unit 3312. At this time, the printer image processing unit 3317 adds the new bar code to the same position as the old bar code in the old manuscript image data. Since the print image data are generated by this addition, the printer image processing unit 3317 performs printer image processing (image processing required for printing in a halftone or the like) to the print image data. In addition, the printer image processing unit 3317 transmits the print image data subjected to the printer image processing through the printer I/F 3318 to the printer unit 3203, and the process goes to step S6010.

It should be noted that according to the present embodiment and the other embodiments, when the new bar code is added to the same position as the old bar code, the old bar code is deleted. That is, the new bar code overwrites the old bar code.

It should be noted that the old bar code is once deleted and then, the new bar code may be added without mentioning.

On the other hand, in a case where at step S6003, it is determined that the bar code is not added, the following processing is performed. First, at step S6008, the bar code generating unit 3315 generates new additional information from set copy control information and information of a user who logs in the copying machine and encodes the new additional information to generate a bar code. Here, "user information" includes a user name and a user ID of a user who logs in the copying machine and a device name.

That is, the copy control information among the additional information to be newly generated by the bar code generating unit 3315 is the set content of the copy control information in advance set and stored in the HDD 3304. The trace information includes information for specifying a copier, such as a printing date, a user name (that is, user ID) of a user which instructs a print, and a device name. In consequence, the bar code generating unit 3315 encodes the additional information to generate a bar code. Thereafter, the generated bar code is transmitted through the image bus 3319 to the printer image processing apparatus 3317 by the bar code generating unit 3315. In addition, the process goes to step S6009.

At step S6009, the printer image processing unit 3317 produces print image data to which the bar code generated in the bar code generating unit 3315 at step S6008 is added. At this time, the printer image processing unit 3317 adds the bar code to a position set as an additional position of the bar code. It should be noted that the additional position of the bar code is added to any of four corners in the printed matter. Each region of the four corners is 3 cm×3 cm in size and a size of the bar code is 2 cm×2 cm. Which corner of the four corners or which position of the corner the bar code is added to is in advance set and the set content is stored in the HDD 3304, but a user may select the set content. Hereinafter, the region of the four corners each having 3 cm×3 cm is called a prescribed area. Thereafter, the printer image processing unit 3317 transmits the print image data generated at step S6009 through the printer I/F 3318 to the printer unit 3203, and the process goes to step S6010.

At step S6010, the job control unit 3320 transmits an instruction of a print start of the print image data to the printer unit 3203.

Here, in a case where the printer unit 3203 already receives the print image data from the printer image processing unit 3317, the printer unit 3203 starts the print of the print image data.

On the other hand, in a case where the printer unit 3203 does not receive the print image data from the printer image processing unit 3317, the printer unit 3203 waits until the image processing in the printer image processing unit 3317 is completed. In addition, after the printer unit 3203 receives the print image data from the printer image processing unit 3317, the printer unit 3203 starts the print of the print image data.

In addition, after the printer unit 3203 prints the print image data, the process ends.

Figure 10:
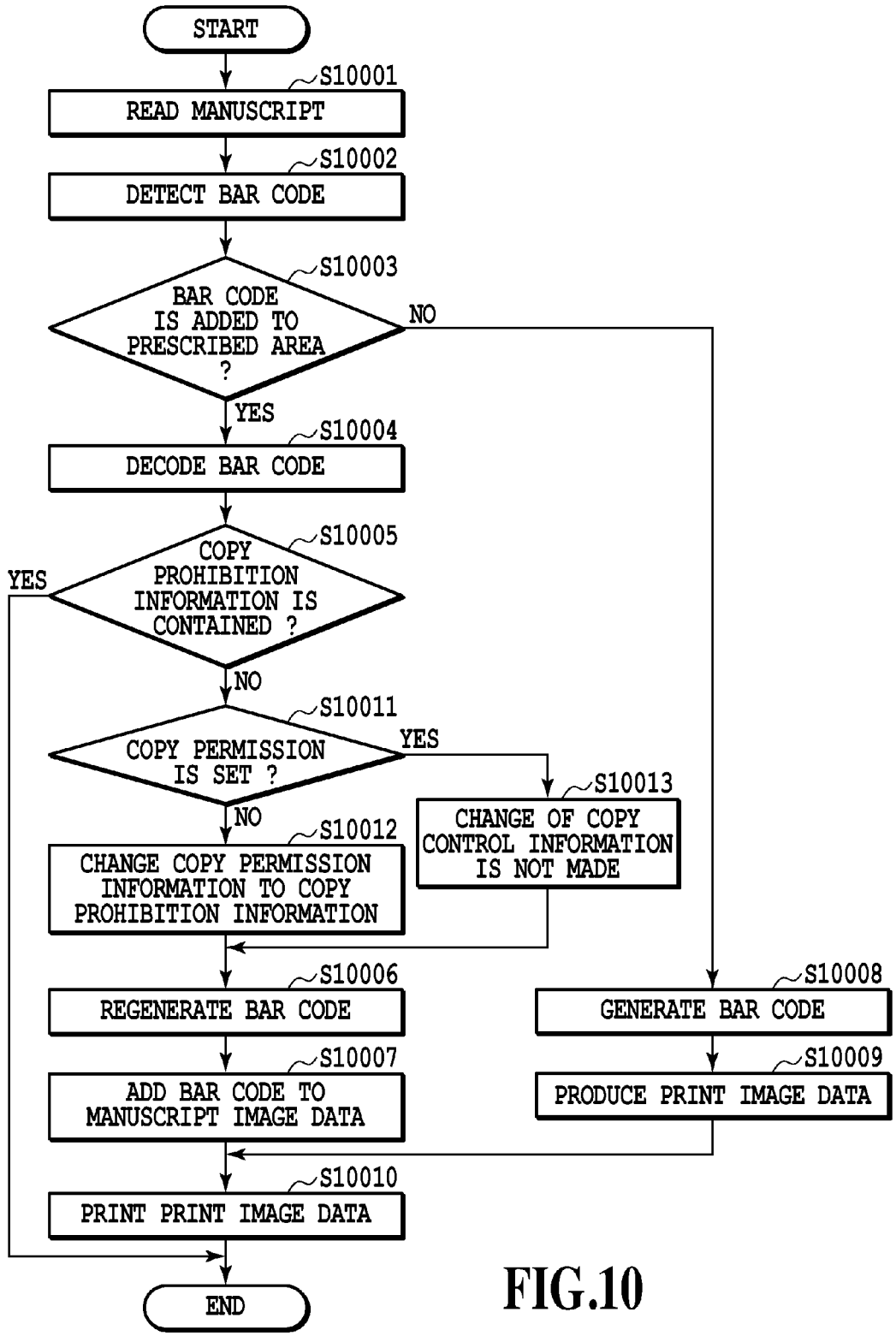
FIG. 10 is a flow chart showing the process order performed by the image processing apparatus 3001.

Then, FIG. 10 will be explained. FIG. 10 is a flow chart showing the process order of the copy control performed by the image processing apparatus 3001 according to the present embodiment.

FIG. 6 is a flow chart on condition that the copy control information of the bar code added to the copied object outputted from the copying machine is set only to the copy operation instructed by a general user. On the other hand, FIG. 10 is a flow chart on condition that the copy permission or the copy prohibition is set to all the pieces of the printed matter in the copying machine by a user such as a manager having a higher operation authority than a general user.

At step S10001, the operation unit 3201 receives the copy start instruction from the user. When the instruction is conveyed to the scanner unit 3202, the scanner unit 3202 reads a manuscript and transmits the read manuscript image data through the scanner I/F 3311 and the scanner image processing unit 3312 to the bar code extraction processing unit 3309. It should be noted that at this time, when the scanner image processing unit 3312 receives the manuscript image data, the scanner image processing unit 3312 performs image processing such as gamma correction. In addition, the scanner image processing unit 3312 transmits the manuscript image data subjected to the image processing to the bar code extraction processing unit 3309 and the printer image processing unit 3317.

Then, at step S10002, the bar code extraction processing unit 3309 performs processing of detecting the bar code from the manuscript image data received from the scanner image processing unit 3312.

In a case where at step S10003, the bar cod extraction processing unit 3309 determines that the bar code is added to the manuscript image data, the process goes to step S10004.

In a case where at step S10003, the bar cod extraction processing unit 3309 determines that the bar code is not added to the manuscript image data, the process goes to step S10008.

At step S10004, the bar code extraction processing unit 3309 performs decoding the bar code detected from the manuscript image data. Therefore, the additional information is obtained from the manuscript image data. After completion of the decoding processing, the process goes to step S10005.

At step S10005, the bar code extraction processing unit 3309 determines whether or not information prohibiting a copy as the copy control information is contained among the additional information. In a case where the information prohibiting the copy is not contained in the copy control information (since the information permitting the copy is contained in the copy control information), the process goes to step S10006. It should be noted that the information prohibiting the copy is information of "1" and the information permitting the copy is information of "0".

In a case where at step S10005, the bar code extraction processing unit 3309 determines that the information prohibiting the copy as the copy control information is contained among the additional information, the job control unit 3320 determines a stop of the copy operation. The job control unit 3320 cancels the job to stop the copy operation of the printer unit 3203. At this time, the job control unit 3320 displays the dialog box 41 shown in FIG. 5 to the operation unit 3201 to inform a user that the bar code is added out of the bar code detection range and the print is stopped. Thereafter, the process ends.

In a case where at step S10005, the bar code extraction processing unit 3309 determines that the information prohibiting the copy as the copy control information is not contained among the additional information, the process goes to step S10011.

In a case where at step S10011, the bar code extraction processing unit 3309 determines that the copy permission is set in the copying machine, the process goes to step S10013. At step S10013, the copy control information is not changed and the process goes step S10006.

In a case where at step S10011, the bar code extraction processing unit 3309 determines that the copy permission is not set in the copying machine (the copy prohibition is set in the copying machine), the process goes to step S10012. At step S10012, the bar code generating unit 3315 changes the copy permission information originally contained in the bar code encoded at step S10004 into the copy prohibition information, and the process goes step S10006.

In this way, when the copy of the manuscript image data is prohibited in the copying machine, in a case where the copy permission information is obtained from the bar code encoded at step S10004, the bar code generating unit 3315 changes the copy permission information into the copy prohibition information.

In a case where the printed matter is thought not to be confidential information and the copy permission information is originally contained in the copy control information, for example, the following processing is possible by the above processing. That is, in a case where the printed matter is found out to be the confidential information after the copy control information is defined and a copy of the printed matter is desired to be prohibited, the copy of the printed matter can be prohibited based upon the setting of the copying machine exceptionally.

At step S10006, the bar code generating unit 3315 generates and encodes new additional information from the additional information, the new trace information and the set copy control information to generate a bar code.

That is, the copy control information and the trace information both among the additional information generated in the bar code generating unit 53315 are updated in information. That is, the copy control information is the set content of the copy control information which is in advance set and stored in the HDD 3304, and the trace information is information produced by adding the new trace information to the original trace information in the additional information. Here, the trace information includes information specifying a copier, such as a printing date, a user name (that is, user ID) of a user which instructs a print, and a device name. In addition, the bar code generating unit 3315 encodes the additional information to generate a bar code. Thereafter, the bar code generating unit 3315 transmits the generated bar code to the printer image processing unit 3317, and the process goes to step S10007.

At step 10007, the printer image processing unit 3317 adds the new bar code generated in the bar code generating unit 3315 at step S10006 to the print image data. At this time, the printer image processing unit 3317 arranges the new generated bar code at the same position as the bar code (inside the manuscript image data) detected in the bar code extraction processing unit 3309. That is, the printer image processing unit 3317, in response to a combination instruction of the bar code to a specific location of the manuscript image data from the scanner image processing unit 3312, adds (combines) the new bar code to the manuscript image data transmitted from the scanner image processing unit 3312. At this time, the printer image processing unit 3317 adds the new bar code to the same position as the old bar code in the old manuscript image data. Since the print image data are generated by this addition, the printer image processing unit 3317 performs printer image processing (image processing required for printing in a halftone or the like) to the print image data. In addition, the printer image processing unit 3317 transmits the print image data subjected to the printer image processing through the printer I/F 3318 to the printer unit 3203, and the process goes to step S10010.

First, at step S10008, the bar code generating unit 3315 generates new additional information from set copy control information and information of a user who logs in the copying machine and encodes the new additional information to generate a bar code.

That is, the copy control information among the additional information to be generated by the bar code generating unit 3315 is the set content of the copy control information to all the pieces of the printed matter in the copying machine by a user such as a manager having a higher operation authority than a general user, which is in advance set and stored in the HDD 3304. The trace information includes information for specifying a copier, such as a printing date, a user name (that is, user ID) of a user which instructs a print, and a device name. Inconsequence, the bar code generating unit 3315 encodes the additional information to generate a bar code. Thereafter, the generated bar code is transmitted through the image bus 3319 to the print image processing unit 3317 by the bar code generating unit 3315.

At step S10009, the printer image processing unit 3317 generates print image data to which the bar code generated in the bar code generating unit 3315 at step S10008 is added. At this time, the printer image processing unit 3317 adds the bar code to a position set as an additional position of the bar code.

Thereafter, the printer image processing unit 3317 transmits the generated print image data through the printer I/F 3318 to the printer unit 3203 and the process goes to step S10010.

At step S10010, the job control unit 3320 transmits an instruction of a print start of the print image data to the printer unit 3203.

In a case where the printer unit 3203 already receives the print image data from the printer image processing unit 3317, the printer unit 3203 starts the print of the print image data.

On the other hand, in a case where the printer unit 3203 does not receive the print image data from the printer image processing unit 3317, the printer unit 3203 waits until the image processing in the printer image processing unit 3317 is completed. In addition, after the printer unit 3203 receives the print image data from the printer image processing unit 3317, the printer unit 3203 starts the print of the print image data. In addition, after printing the print image data, the process ends.

Figure 11:
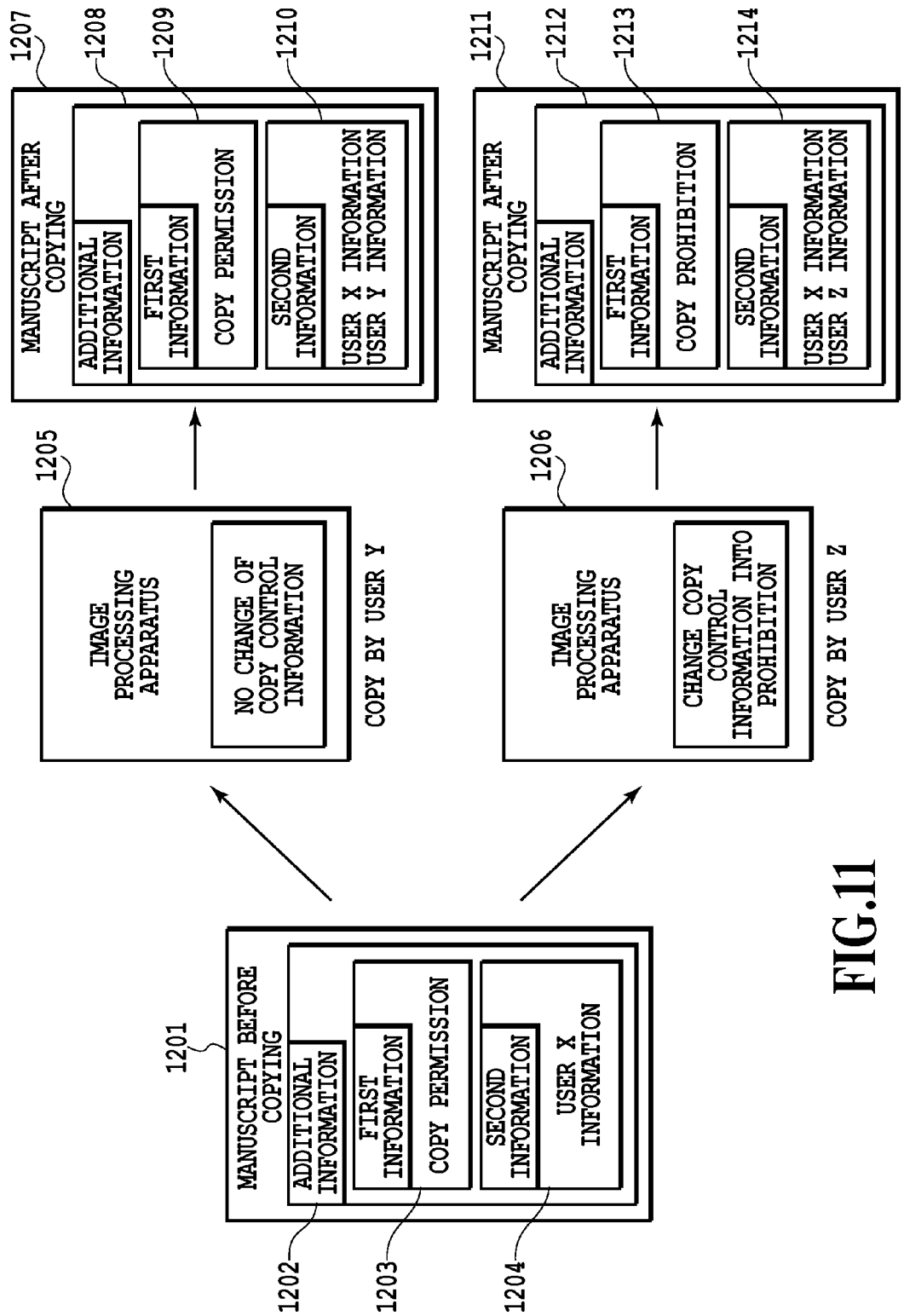
FIG. 11 is a diagram showing a change in additional information added as an encoded bar code to the printed matter according to a flow chart in each of FIG. 6 and FIG. 10.

FIG. 11 is a diagram showing a change of the additional information which is encoded according to the process order in each of FIG. 6 and FIG. 10 and added to the printed matter.

In a manuscript 1201 before copying, additional information 1202 is added and printed. In first information 1203 of the additional information 1202, copy permission is recorded as the copy control information and in second information 1209, user X information is recorded as the trace information.

In an image processing apparatus 1205, the setting of not changing the copy control information of a bar code to be added is made.

On the other hand, in an image processing apparatus 1206, the setting of changing the copy control information of a bar code to be added into the copy prohibition is made.

Here, in a case where a user Y copies the manuscript 1201 before copying by the image processing apparatus 1205, the processing in FIG. 6 is performed, wherein the second information, that is, only the trace information is updated.

As a result, as shown in a manuscript 1207 after copying, user Y information as the latest trace information which has copied that manuscript among the additional information 1208 results in being added to the second information 1210.

On the other hand, in a case where a user Z copies the manuscript 1201 before copying by an image processing apparatus 1206, the processing in FIG. 10 is performed, wherein the first information and the second information, that is, the copy control information and the trace information are updated.

As a result, as shown in a manuscript 1211 after copying, among additional information 1212, the first information 1213 is changed into the copy prohibition and user Z information as the latest trace information which has copied that manuscript results in being added to the second information 1214.

In this way, a security level of the copied object can be maintained by updating the content of the trace information of the bar code on the copied object and at the same time, changing succession and change of the copy control information.

Second Embodiment

Next, a second embodiment will be explained.

Figure 8A:
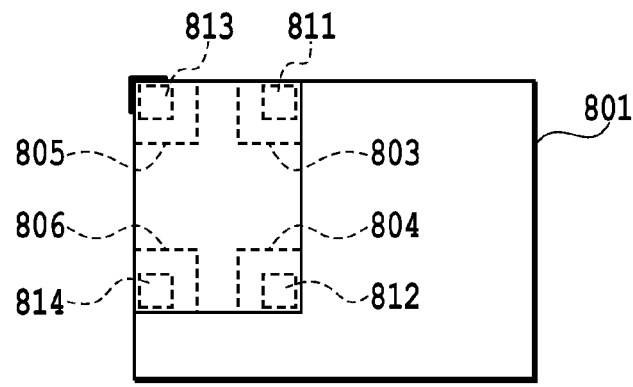
FIG. 8A is a diagram showing a reading range of a paper manuscript.

FIG. 8A is a diagram showing a reading range of a paper manuscript and a detection range of a bar code in the scanner unit 3202.

The maximum manuscript reading range 801 is the maximum reading range of the scanner unit 3202.

The manuscript reading range 802 is an area for scanning a sheet placed on a manuscript table and is a range set to be matched to a size of a paper manuscript at the time the paper manuscript is actually read within the maximum manuscript reading range 801. Accordingly, data scanned in the manuscript reading range 802 are manuscript image data. It should be noted that the manuscript reading range 802 becomes equal to the maximum manuscript reading range 801 at a maximum and does not expand any larger than it without mentioning.

The bar code detection ranges 803 to 806 are a region in advance set within the manuscript reading range 802 and are a search area in which the processing for searching the bar code within the region is performed. In addition, the detection ranges 803 to 806 respectively are set to four corners of the manuscript. It should be noted that each of the detection ranges 803 to 806 can be set to any size. However, it is preferable that each of the detection ranges 803 to 806 is smaller than the manuscript reading range 802 and larger than each of the prescribed areas 811 to 814. The reason for setting each of the detection ranges 803 to 806 to be smaller than the manuscript reading range 802 is to improve a detection speed. In addition, the reason for setting each of the detection ranges 803 to 806 to be larger than any of the prescribed areas 811 to 819 is that even if a user does not appropriately places a piece of printed matter on a copying machine (for example, in a case of placing it orthogonally), a detection accuracy of the bar code is improved. Therefore, it is preferable to set an area of 5 cm×5 cm to each of the bar code detection ranges 803 to 806. It should be noted that this detection range may be a detection range of a default and a size of the detection range may be changed later.

Figure 8B:
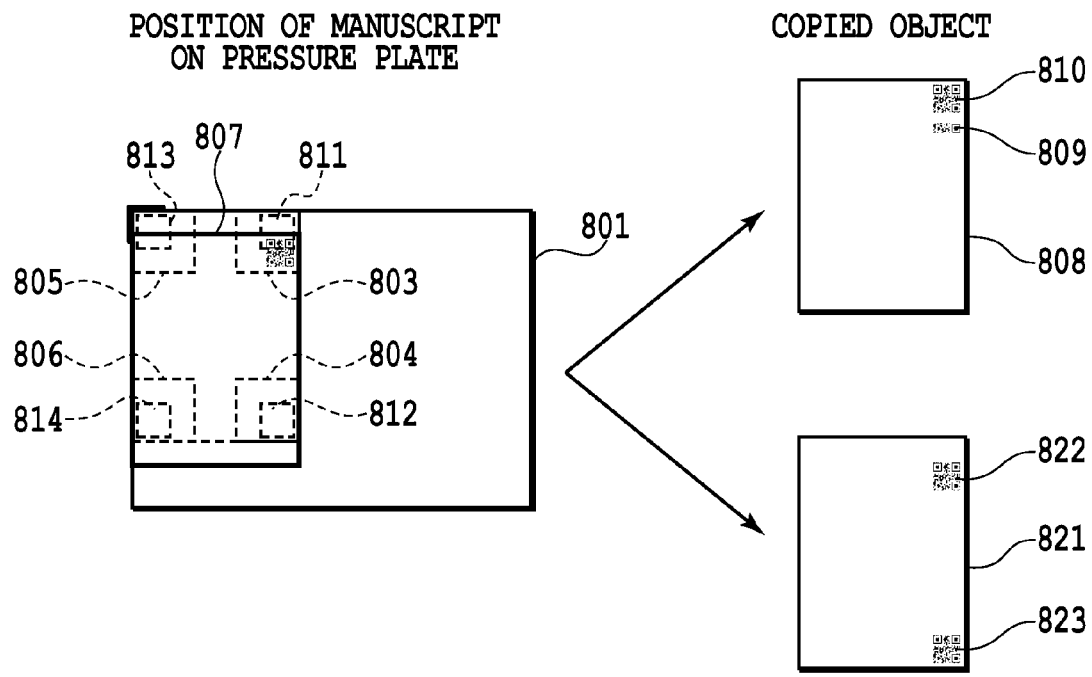
FIG. 8B is a diagram explaining a copy result in a case where the manuscript is placed out of the reading range.

FIG. 8B shows a copy result according to the first embodiment in a case where the paper manuscript 807 is placed out of the reading range, that is, in a case where the bar code is placed out of the prescribed areas 811 to 814.

A copied object 808 is a copied object in a case where an additional position of the bar code set in the copying machine is a top right side of the manuscript. Since an original bar code 809 placed on the manuscript and a newly added bar code 810 overlap, pieces of the original bar code 809 remain on the copied object 808.

On the other hand, a copied object 821 is a copied object in a case where an additional position of the bar code set in the copying machine is a bottom right side of the manuscript. Since an original bar code 822 placed on the manuscript and a newly added bar code 823 exist in different locations, the original bar code 822 and the new bar code 823 both exist on the copied object 811.

The second embodiment is designed in such a manner that the original code of the manuscript is not left on the copied object. In addition, the second embodiment is a control method in the copying machine for generating, even when a paper manuscript is placed out of a manuscript reading range, a copied object to which a bar code is added in an additional position of the bar code set in the copying machine.

Figure 7:
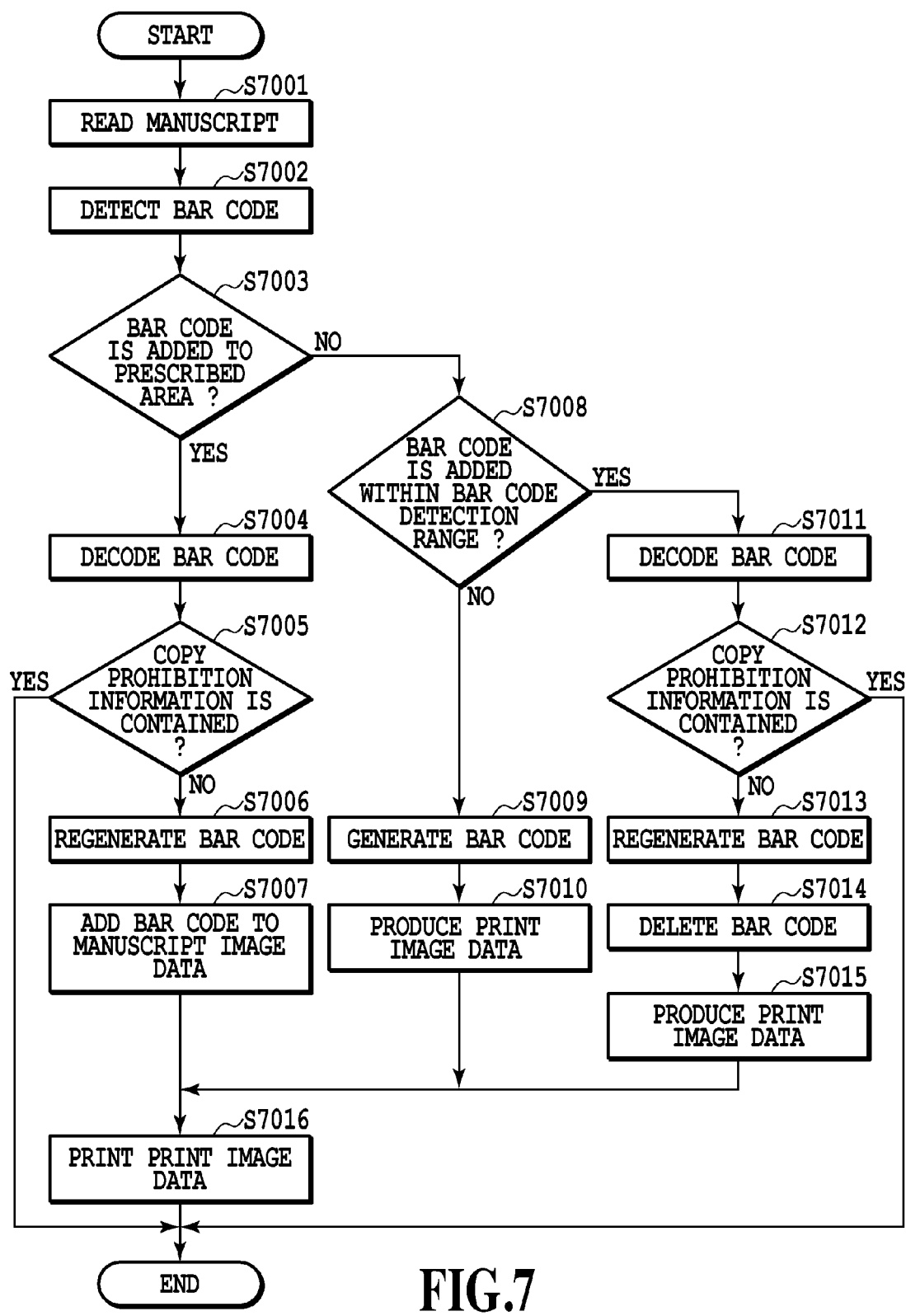
FIG. 7 is a flow chart showing the process order of the copy control performed by the copying machine.

FIG. 7 is a flow chart showing the process order of copy control performed by the copying machine.

At step S7001, the operation unit 3201 receives the copy start instruction from the user. When the instruction is conveyed to the scanner unit 3202, the scanner unit 3202 reads a manuscript and transmits the read manuscript image data through the scanner I/F 3311 and the scanner image processing unit 3312 to the bar code extraction processing unit 3309. It should be noted that at this time, when the scanner image processing unit 3312 receives the manuscript image data, the scanner image processing unit 3312 performs image processing such as gamma correction. In addition, the scanner image processing unit 3312 transmits the manuscript image data subjected to the image processing to the bar code extraction processing unit 3309 and the printer image processing unit 3317.

At step S7002, the bar code extraction processing unit 3309 performs processing of detecting a bar code from bar code detection ranges 803 to 806 in manuscript image data received from the scanner image processing unit 3312. A combination of the processing of reading a manuscript and the processing of detecting a bar code from the read manuscript image may be called "processing of searching a bar code".

In a case where at step S7003, the bar code extraction processing unit 3309 determines that the bar code is added within the prescribed areas 811 to 814 (each of 3 cm×3 cm) in the bar code detection ranges 803 to 806 of the manuscript image data, the process goes to step S7009.

In a case where at step S7003, the bar code extraction processing unit 3309 determines that the bar code is not added in the prescribed areas 811 to 814 of the manuscript image data, the process goes to step S7008.

At step S7004, the bar code extraction processing unit 3309 performs decoding the bar code detected from the manuscript image data. Therefore, the additional information is obtained from the manuscript image data. After completion of the decoding, the process goes to step S7005.

At step S7005, the bar code extraction processing unit 3309 determines whether or not information prohibiting a copy as the copy control information is contained among the additional information. In a case where the information prohibiting the copy is not contained in the copy control information, since the information permitting the copy (copy permission information) is contained in the copy control information, the process goes to step S7006. It should be noted that the information prohibiting the copy (copy prohibition information) is information of "1" and the information permitting the copy (copy permission information) is information of "0".

In a case where at step S7005, the bar code extraction processing unit 3309 determines that the information prohibiting the copy (copy prohibition information) as the copy control information is contained among the additional information, the job control unit 3320 determines a stop of the copy operation. The job control unit 3320 cancels the job to stop the copy operation of the printer unit 3203. At this time, the job control unit 3320 displays the dialog box 41 shown in FIG. 5 to the operation unit 3201 and informs a user of stopping the print. Thereafter, the process ends.

At step S7006, the bar code generation unit 3315 generates new additional information from the additional information and the new trace information to encode new additional information, for regenerating a bar code.

That is, the bar code generating unit 3315 maintains the copy control information among the additional information obtained in the bar code extraction processing unit 3309 as it is. That is, the copy control information is not changed to be maintained as the same information. On the other hand, the trace information is updated in such a manner as to add new trace information to the old trace information. That is, the copy control information is maintained as it is and only the trace information is updated. Here, the copy control information is the set content of the copy control information which is in advance set and stored in the HDD 3304, and the trace information is information produced by adding new trace information to the original trace information in the additional information. Here, the trace information includes information for specifying a copier, such as a printing date, a user name (that is, user ID) of a user which instructs a print, and a device name. In addition, the bar code generating unit 3315 encodes the additional information to generate a bar code. Thereafter, the bar code generating unit 3315 transmits the generated bar code to the printer image processing unit 3317, and the process goes to step S7007.

At step 7007, the printer image processing unit 3317 adds the new bar code generated by the bar code generating unit 3315 at step S7006 to the print image data. At this time, the printer image processing unit 3317 arranges the new generated bar code at the same position as the bar code detected in the bar code extraction processing unit 3309. That is, the printer image processing unit 3317, in response to a combination instruction of the bar code to a specific location of the manuscript image data from the scanner image processing unit 3312, adds (combines) a new bar code to the manuscript image data transmitted from the scanner image processing unit 3312. At this time, the printer image processing unit 3317 adds the new bar code to the same position as the old bar code in the old manuscript image data. Since the print image data are generated by this addition, the printer image processing unit 3317 performs printer image processing (image processing required for printing in a halftone or the like) to the print image data. In addition, the printer image processing unit 3317 transmits the print image data subjected to the printer image processing through the printer I/F 3318 to the printer unit 3203, and the process goes to step S7016.

In a case where at step S7008, the bar code extraction processing unit 3309 determines that the bar code is not added within the bar code detection ranges 803 to 806 of the manuscript image data, the process goes to step S7009.

In a case where at step S7008, the bar code extraction processing unit 3309 determines that the bar code is added out of the bar code detection ranges 803 to 806 of the manuscript image data, the process goes to step S7011.

At step S7009, the bar code generating unit 3315 generates new additional information from set copy control information and information of a user who logs in the copying machine and encodes the new additional information to generate a bar code. That is, the copy control information among the additional information to be generated by the bar code generating unit 3315 is the set content of the copy control information, which is in advance set and stored in the HDD 3304. The trace information includes information for specifying a copier (such as a printing date, a user name (that is, user ID) of a user which instructs a print, and a device name). In addition, the bar code generating unit 3315 encodes the additional information to generate a bar code. Thereafter, the generated bar code is transmitted through the image bus 3319 to the printer image processing unit 3317 by the bar code generating unit 3315. The process goes to step S7010.

At step S7010, the printer image processing unit 3317 generates print image data to which the bar code generated in the bar code generating unit 3315 at step S7009 is added. At this time, the printer image processing unit 3317 adds the bar code to a position set as an additional position of the bar code stored in the HDD 3304. Thereafter, the printer image processing unit 3317 transmits the print image data generated at step S7010 through the printer I/F 3318 to the printer unit 3203 and the process goes to step S7016.

At step S7011, the bar code extraction processing unit 3309 performs decoding processing to the bar code detected from the manuscript image data. Therefore, the additional information is obtained from the manuscript image data. After completion of the decoding processing, the process goes to step S7012.

At step S7012, the bar code extraction processing unit 3309 determines whether or not information prohibiting a copy as the copy control information is contained among the additional information. In a case where the information prohibiting the copy is not contained in the copy control information (since the information permitting the copy is contained in the copy control information), the process goes to step S7013.

In a case where at step S7012, the bar code extraction processing unit 3309 determines that the information prohibiting the copy as the copy control information is contained among the additional information, the job control unit 3320 determines a stop of the copy operation. The job control unit 3320 cancels the job to stop the copy operation of the printer unit 3203. At this time, the job control unit 3320 displays the dialog box 41 shown in FIG. 5 to the operation unit 3201 and informs a user of stopping the print. Thereafter, the process ends.

At step S7013, the bar code generation unit 3315 generates and encodes new additional information from the additional information and the new trace information, thereby regenerating a bar code.

Specially the bar code generating unit 3315 maintains the copy control information (that is, information permitting a copy (copy permission information)) among the additional information obtained in the bar code extraction processing unit 3309 as it is. That is, the copy control information (copy permission information) is not changed to be maintained as the same information. On the other hand, the trace information is updated in such a manner as to add new trace information to the old trace information. That is, the copy control information is maintained as it is and only the trace information is updated. With this processing, an initial intent of a user who has permitted the copy and produced the printed matter can be respected. Thereafter, the bar code generating unit 3315 transmits the generated bar code to the printer image processing unit 3317, and the process goes to step S7014.

At step S7014, the printer image processing unit 3317 deletes (erases) the bar code detected by the bar code extraction unit 3309 at step S7008. That is, the printer image processing unit 3317 combines a solid image in a background color on a trace where the bar code is deleted so as to overlap the detected bar code for deleting (erasing) the bar code. Thereafter, the process goes to step S7015.

At step S7015, the printer image processing unit 3317 adds the bar code generated at step S7013 to the manuscript image data in which the bar code is deleted at step S7014 to produce print image data. At this time, the nearest corner at a position where the bar code is originally added is specified.

For example, as the paper manuscript 807 shown in FIG. 8B, there will be explained a case where a bar code is originally added at a position of the top right corner. In this case, since the nearest prescribed area to the bar code is the prescribed area 811, the bar code generated at step S7013 is added inside the prescribed area 811. It goes without saying that to which position in the prescribed area 811 the bar code image is added may depend on selection of a user. In addition, together with it, the bar code image may be stored in the HDD 3304. Thereafter, the printer image processing unit 3317 transmits the print image data produced at step S7015 through the printer I/F 3318 to the printer unit 3203 and the process goes to step S7016.

At step S7016, the job control unit 3320 transmits an instruction of a print start of the print image data to the printer unit 3203.

Here, in a case where the printer unit 3203 already receives the print image data from the printer image processing unit 3317, the printer unit 3203 starts the print of the print image data.

On the other hand, in a case where the printer unit 3203 does not receive the print image data from the printer image processing unit 3317, the printer unit 3203 waits until the image processing in the printer image processing unit 3317 is completed. In addition, after the printer unit 3203 receives the print image data from the printer image processing unit 3317, the printer unit 3203 starts the print of the print image data. In addition, after printing the print image data, the process ends.

In this way, the operation in FIG. 7 changes a position to which the bar code is added corresponding to the determination result on whether the location where the bar code is detected on the manuscript image data is within the prescribed area or out of the prescribed area.

That is, in a case where the bar code extraction processing unit 3309 determines that the bar code is embedded within the prescribed area in the manuscript image data, there are produced print image data in which a new bar code is added to the same position as the original bar code of the manuscript image data.

In addition, in a case where the bar code extraction processing unit 3309 determines that the bar code is added out of the prescribed area in the manuscript image data, the following processing is performed. That is, there are produced print image data in which the original bar code in the manuscript image data is deleted and a new bar code is added to the nearest corner.

In a case where the bar code extraction processing unit 3309 determines that the bar code is not embedded within the bar code detection ranges 803 to 806 of the manuscript image data, there are produced print image data in which the bar code is added within a prescribed area set by a user.

By thus updating the content of the trace information and performing succession of the copy control information, the event that pieces of the original bar code are left on the copied object or the original bar code and the new bar code both exist thereon can be prevented.

Third Embodiment

Next, a third embodiment will be explained. In the second embodiment, in a case where it is determined that the bar code is embedded out of the prescribed areas 811 to 814 in the manuscript image data, the bar code in the manuscript image data is deleted. In addition, there are produced the print image data in which the new bar code is added in the prescribed area set by a user.

The third embodiment can, in a case where it is determined that the bar code is embedded out of the prescribed areas 811 to 814 in the manuscript image data in the same way with the second embodiment, prevent the event that pieces of the original bar code are left on the copied object or the original bar code and the new bar code both exist.

Figure 9:
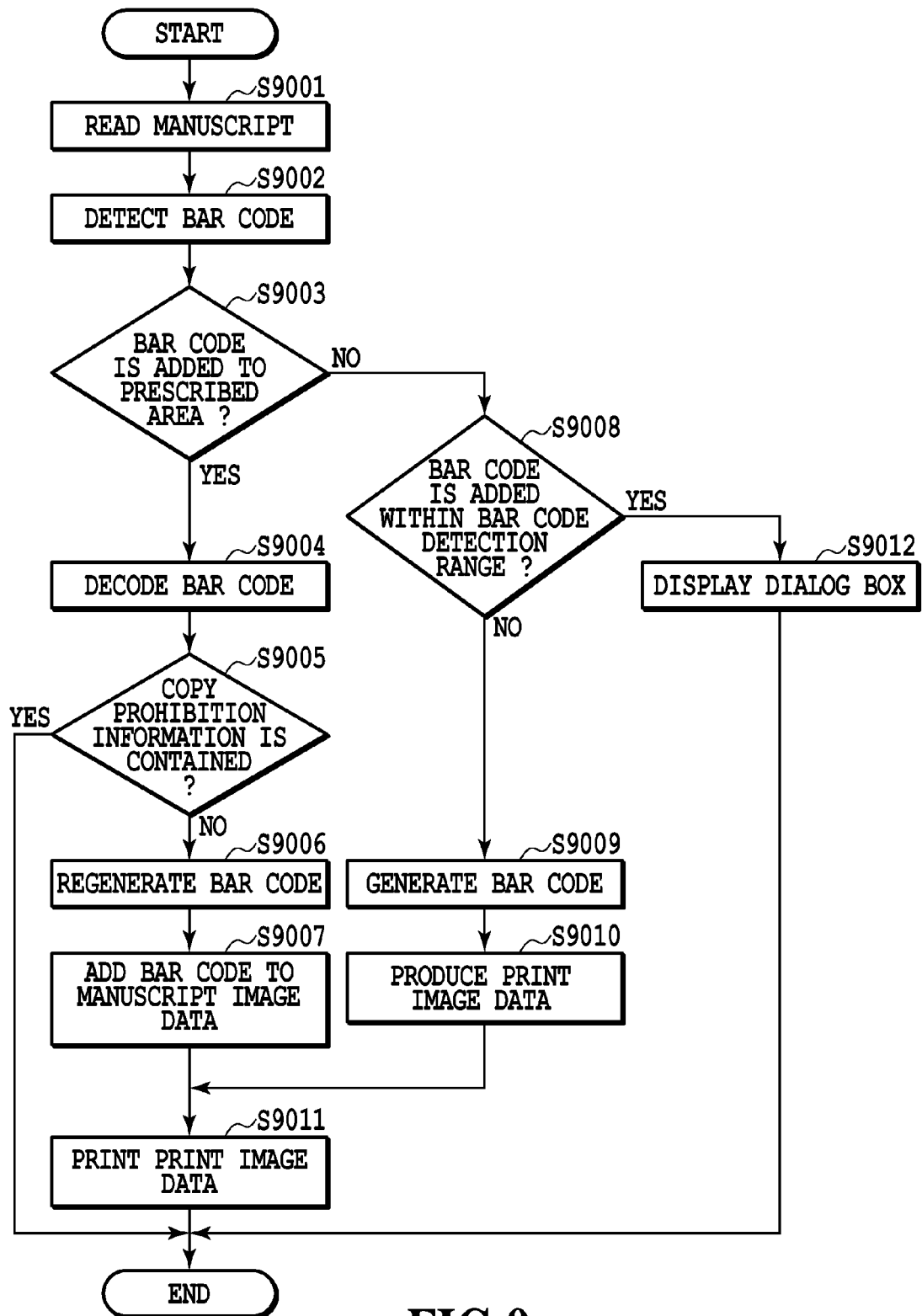
FIG. 9 is a flow chart showing the process order of the copy control performed by the copying machine.

FIG. 9 is a flow chart showing the process order of copy control performed by the copying machine.

At step S9001, the operation unit 3201 receives a copy start instruction from a user. When the instruction is conveyed to the scanner unit 3202, the scanner unit 3202 reads a manuscript and transmits the read manuscript image data through the scanner I/F 3311 and the scanner image processing unit 3312 to the bar code extraction processing unit 3309. It should be noted that at this time, when the scanner image processing unit 3312 receives the manuscript image data, the scanner image processing unit 3312 performs image processing such as gamma correction. In addition, the scanner image processing unit 3312 transmits the manuscript image data subjected to the image processing to the bar code extraction processing unit 3309 and the printer image processing unit 3317.

At step S9002, the bar code extraction processing unit 3309 performs processing of detecting a bar code from the manuscript image data received from the scanner image processing unit 3312.

In a case where at step S9003, the bar code extraction processing unit 3309 determines that the bar code is added in the prescribed areas 811 to 814 of the manuscript image data in response to an instruction of the job control unit 3320, the process goes to step S9004.

In a case where at step S9003, the bar code extraction processing unit 3309 determines that the bar code is not added in the prescribed areas 811 to 814 of the manuscript image data in response to the instruction of the job control unit 3320, the process goes to step S9008.

at step S9004, the bar code extraction processing unit 3309 performs decoding processing to the bar code detected from the manuscript image data. Therefore, the additional information is obtained from the manuscript image data. After completion of the decoding processing, the process goes to step S9005.

At step S9005, the bar code extraction processing unit 3309 determines whether or not information prohibiting a copy (copy prohibition information) as the copy control information is contained among the additional information. In a case where the information prohibiting the copy is not contained in the copy control information, since the information permitting the copy (copy permission information) is contained in the copy control information, the process goes to step S9006. It should be noted that the information prohibiting the copy (copy prohibition information) is information of "1" and the information permitting the copy (copy permission information) is information of "0".

In a case where at step S9005, the bar code extraction processing unit 3309 determines that the information prohibiting the copy (copy prohibition information) as the copy control information is contained among the additional information, the job control unit 3320 determines a stop of the copy operation. The job control unit 3320 cancels the job to stop the copy operation of the printer unit 3203. At this time, the job control unit 3320 displays the dialog box 41 shown in FIG. 5 to the operation unit 3201 and informs a user of stopping the print. Thereafter, the process ends.

At step S9006, the bar code generating unit 3315 generates and encodes new additional information from the additional information and the new trace information, that is, information of a user who logs in the copying machine, thereby regenerating a bar code.

That is, the copy control information and the trace information both among the additional information generated at the bar code generating unit S3315 are updated in information. That is, the copy control information is the set content of the copy control information which is in advance set and stored in the HDD 3304, and the trace information is information produced by adding new trace information to the original trace information in the additional information. Here, the trace information includes information for specifying a copier, such as a printing date, a user name (that is, user ID) of a user which instructs a print, and a device name. In addition, the bar code generating unit 3315 encodes the additional information to generate a bar code. Thereafter, the bar code generating unit 3315 transmits the generated bar code to the printer image processing unit 3317, and the process goes to step S9007.

At step 9007, the printer image processing unit 3317 adds the new bar code generated in the bar code generating unit 3315 at step S9006 to the print image data. At this time, the printer image processing unit 3317 arranges the new generated bar code at the same position as the bar code detected on the manuscript image data by the bar code extraction processing unit 3309. That is, the printer image processing unit 3317 adds (combines), in response to a combination instruction of the bar code to a specific location of the manuscript image data from the scanner image processing unit 3312, a new bar code to the manuscript image data transmitted from the scanner image processing unit 3312. At this time, the printer image processing unit 3317 adds the new bar code to the same position as the old bar code in the old manuscript image data. Since the print image data are generated by this addition, the printer image processing unit 3317 performs printer image processing (image processing required for printing in a halftone or the like) to the print image data. In addition, the printer image processing unit 3317 transmits the print image data subjected to the printer image processing through the printer I/F 3318 to the printer unit 3203, and the process goes to step S9011.

In a case where at step S9008, the bar code extraction processing unit 3309 determines that the bar code is not added also in the bar code detection ranges 803 to 806 of the manuscript image data, the process goes to step S9009.

In a case where at step S9008, the bar code extraction processing unit 3309 determines that the bar code is added within the bar code detection ranges 803 to 806 of the manuscript image data, the process goes to step S9012.

First, at step S9009, the bar code generating unit 3315 generates new additional information from set copy control information and information of a user who logs in the copying machine and encodes the new additional information to generate a bar code. That is, the copy control information among the additional information to be generated by the bar code generating unit 3315 is the set content of the copy control information, which is in advance set and stored in the HDD 3304. The trace information includes information for specifying a copier (such as a printing date, a user name (that is, user ID) of a user which instructs a print, and a device name). In consequence, the bar code generating unit 3315 encodes the additional information to generate a bar code. Thereafter, the bar code generated at step S9009 is transmitted through the image bus 3319 to the image processing apparatus 3317 by the bar code generating unit 3315. The process goes to step S9010.

At step S9010, the printer image processing unit 3317 generates print image data to which the bar code generated in the bar code generating unit 3315 at step S9009 is added. At this time, the printer image processing unit 3317 adds the bar code to a position set as an additional position of the bar code stored in the HDD 3304. Thereafter, the printer image processing unit 3317 transmits the generated print image data through the printer I/F 3318 to the printer unit 3203, and the process goes to step S9011.

At step S9011, the job control unit 3320 transmits an instruction of a print start of the print image data to the printer unit 3203.

In addition, in a case where the printer unit 3203 already receives the print image data from the printer image processing unit 3317, the printer unit 3203 starts the print of the print image data.

On the other hand, in a case where the printer unit 3203 does not receive the print image data from the printer image processing unit 3317, the printer unit 3203 waits until the image processing in the printer image processing unit 3317 is completed. In addition, after the printer unit 3203 receives the print image data from the printer image processing unit 3317, the printer unit 3203 starts the print of the print image data. In addition, after printing the print image data, the process ends.

At step S9012, the job control unit 3320 determines a stop of the copy operation. The job control unit 3320 cancels the job to stop the copy operation of the printer unit 3203. At this time, the job control unit 3320 displays a dialog box 1301 shown in FIG. 12 on the operation unit 3201 to inform a user of stopping the print. Thereafter, the process ends.

In consequence, the event that the pieces of the original bar code are left on the copied object or the original bar code and the new bar code both exist thereon can be prevented. In addition, by updating the content of the trace information and also switching the succession and the change of the copy control information in the bar code on the copied object, the security level of the copied object can be maintained.

It should be noted that the above embodiments can be applied to the copying machine having functions of scanning and printing, but also to a copying machine having functions of scanning, fax transmitting and e-mail transmitting.

In each explanation of the present embodiment and the like (the present embodiment and the embodiments other than it), there is exemplified a case where the bar code of the prescribed size (as an area) capable of containing information of the prescribed size (as an information amount) is an object. It should be noted that the bar code of this prescribed size can contain not only the information of the prescribed size, but also information less than the prescribed size.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-211844, filed Sep. 14, 2009, 2010-168485 filed Jul. 27, 2010, which are hereby incorporated by reference herein in their entirety.

What is claimed is:

1. An apparatus, comprising:
    a reading unit configured to read a document to obtain image data;
    a detection unit configured to detect a bar code in the image data;
    a generation unit configured to generate a new bar code based on information included in the detected bar code;
    an identifying unit configured to identify the nearest corner to a position where the bar code is detected; and
    an addition unit configured to add the new bar code at the nearest corner in the image data.

2. The apparatus according to claim 1, wherein the generation unit adds new information to the information included in the detected bar code, and generates the new bar code from information obtained by the result of the addition.

3. The apparatus according to claim 1, wherein the detected bar code includes copy control information and trace information, and
    wherein the generation unit changes the trace information without changing the copy control information and generates the new bar code from the unchanged copy control information and the changed trace information.

4. The apparatus according to claim 3, wherein the trace information is changed by adding new trace information to the trace information.

5. The apparatus according to claim 3, wherein the trace information is a user name.

6. The apparatus according to claim 4, further comprising:
    a print unit configured to print image data obtained by the addition,
    wherein the new trace information includes a user name of a user instructing the printing.

7. The apparatus according to claim 1, wherein the addition unit adds the new bar code in a prescribed area in the nearest corner.

8. The apparatus according to claim 7, wherein the detection unit detects a bar code in an area larger than the prescribed area in the image data.

9. The apparatus according to claim 1, wherein the addition unit deletes the detected bar code.

10. A method comprising the steps of:
reading a document to obtain image data;
detecting a bar code in the image data;
generating a new bar code based on information included in the detected bar code;
identifying the nearest corner to a position where the bar code is detected; and
adding the new bar code at the nearest corner in the image data.

11. The method according to claim 10, wherein the generating step adds new information to the information included in the detected bar code, and generates the new bar code from information obtained by the result of the addition.

12. The method according to claim 10, wherein the detected bar code includes copy control information and trace information, and
Wherein the generating step changes the trace information without changing the copy control information and generates the new bar code from the unchanged copy control information and the changed trace information.

13. The method according to claim 12, wherein the trace information is changed by adding new trace information to the trace information.

14. The method according to claim 13, further comprising the step of:
printing image data obtained by the addition,
wherein the new trace information includes a user name of a user who instructed the printing.

15. The method according to claim 12, wherein the trace information is a user name.

16. The method according to claim 10, wherein the adding step adds the new bar code in a prescribed area in the nearest corner.

17. The method according to claim 16, wherein the detecting step detects a bar code in an area larger than the prescribed area in the image data.

18. The method according to claim 10, wherein the adding step deletes the detected bar code.

19. A non-transitory computer readable recording medium storing a program for causing a computer to execute the process of:
reading a document to obtain image data;
detecting a bar code in the image data;
generating a new bar code based on information included in the detected bar code;
identifying the nearest corner to a position where the bar code is detected; and
adding the new bar code at the nearest corner in the image data.

* * * * *